(12) United States Patent
Barber et al.

(10) Patent No.: US 11,210,621 B1
(45) Date of Patent: Dec. 28, 2021

(54) SYSTEM AND METHOD FOR IMPLEMENTING A SUPPLIER DASHBOARD

(71) Applicant: JPMorgan Chase Bank, N.A., New York, NY (US)

(72) Inventors: Dror Barber, Teaneck, NJ (US); Jonathan Lalima, Manalapan, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 317 days.

(21) Appl. No.: 15/639,023

(22) Filed: Jun. 30, 2017

(51) Int. Cl.
*G06Q 10/06* (2012.01)

(52) U.S. Cl.
CPC ....... *G06Q 10/0635* (2013.01); *G06Q 10/063* (2013.01); *G06Q 10/0637* (2013.01); *G06Q 10/0639* (2013.01)

(58) Field of Classification Search
CPC ........... G06Q 10/0635; G06Q 10/0637; G06Q 10/0639; G06Q 10/063
See application file for complete search history.

(56) References Cited

U.S. PATENT DOCUMENTS

| | | | | |
|---|---|---|---|---|
| 2006/0053029 A1* | 3/2006 | Butler | ............ | G06Q 10/00 705/7.36 |
| 2010/0324952 A1* | 12/2010 | Bastos | ............ | G06Q 10/00 705/7.28 |
| 2013/0041713 A1* | 2/2013 | Henrich | ............ | G06Q 10/0635 705/7.28 |
| 2014/0156513 A1* | 6/2014 | Psota | ............ | G06Q 30/06 705/39 |
| 2015/0066567 A1* | 3/2015 | Shami | ............ | G06Q 10/06315 705/7.25 |
| 2016/0071152 A1* | 3/2016 | Nicklin | ............ | G06Q 30/0255 705/14.16 |
| 2017/0193411 A1* | 7/2017 | Vashistha | ............ | G06Q 10/0635 |

OTHER PUBLICATIONS

Oracle Data Sheet, Oracle Financials Cloud (Year: 2016).*

* cited by examiner

*Primary Examiner* — Nadja N Chong Cruz
(74) *Attorney, Agent, or Firm* — Hunton Andrews Kurth LLP

(57) ABSTRACT

The invention relates to a method and system that implements an interactive supplier dashboard. A system comprises: a memory interface; an interactive user interface; and a supplier processor programmed to: receive, via the interactive user interface, a supplier identifier associated with a supplier; identify one or more sources of supplier data using the supplier identifier; aggregate data from the one or more sources of supplier data; pre-stage the aggregated data for the interactive supplier dashboard; and communicate, via the interactive supplier dashboard, the aggregated data for the supplier; wherein the interactive supplier dashboard comprises a plurality of segments of a circular graphical interface. The plurality of segments comprise spend segment; sourcing and procurement segment; risk and control segment; performance and health segment; hosted applications segment; channel compliance segment; relationship management segment; and third party oversight segment.

20 Claims, 15 Drawing Sheets

| | 810 | 812 | 814 | 816 | 818 | 820 | |
|---|---|---|---|---|---|---|---|
| Client/Supplier Match | | NDA Report | Pipeline Deals | Tech Sourcing Pipeline | Sourcing Deal Summary | Client Summary by Team | |
| Contract ID | Contract Status | Contract Creation Date | Contract Creation Period | Supplier | Ultimate Parent Name | FY 2015 Spend | FY 2015 Dominant Spend Category | Banking Coverage LOB |
| CW425 | Draft | 9/14/2016 | Sep 2016 | R-CO, LLC | - | - | - | - |
| CW427 | Draft | 9/14/2016 | Sep 2016 | ABC LTD | - | - | - | - |
| CW100 | Draft | 9/13/2016 | Sep 2016 | CLOUD, INC. | - | - | - | - |
| CW598 | Draft | 9/9/2016 | Sep 2016 | SEC CO. | - | - | - | - |

Figure 8

SYSTEM AND METHOD FOR IMPLEMENTING A SUPPLIER DASHBOARD

FIELD OF THE INVENTION

The invention relates generally to a system and method for implementing an interactive dashboard, and more particularly to a system and method that provides a comprehensive intelligent analysis and view of a supplier's relationship with an entity via an interactive supplier dashboard.

BACKGROUND OF THE INVENTION

Oftentimes, an entity will engage various suppliers for many different tasks and functions. Current systems may provide a total amount of spend for a particular supplier for a time frame. However, there is no mechanism for bringing together the many facets of a supplier base. Moreover, there is no mechanism that enables an entity to ascertain a total supplier relationship.

These and other drawbacks currently exist.

SUMMARY OF THE INVENTION

According to one embodiment, the invention relates to a computer implemented system that provides an interactive supplier dashboard. The system comprises: a memory interface that accesses data from a plurality of sources; an interactive user interface; and a supplier processor, coupled to the memory and the interactive user interface, programmed to: receive, via the interactive user interface, a supplier identifier associated with a supplier; identify one or more sources of supplier data using the supplier identifier; aggregate data from the one or more sources of supplier data; pre-stage the aggregated data for the interactive supplier dashboard; and communicate, via the interactive supplier dashboard, the aggregated data for the supplier; wherein the interactive supplier dashboard comprises a plurality of segments of a circular graphical interface, wherein the plurality of segments comprise (1) spend segment; (2) sourcing and procurement segment; (3) risk and control segment; (4) performance and health segment; (5) hosted applications segment; (6) channel compliance segment; (7) relationship management segment; and (8) third party oversight segment.

The system may include a specially programmed computer system comprising one or more computer processors, mobile devices, electronic storage devices, and networks.

The invention also relates to computer implemented method that provides an interactive supplier dashboard. The method comprises the steps of: receiving, via an interactive user interface, a supplier identifier associated with a supplier; identifying one or more sources of supplier data using the supplier identifier; aggregating data from the one or more sources of supplier data; pre-staging the aggregated data for the interactive supplier dashboard; and communicating, via the interactive supplier dashboard, the aggregated data for the supplier; wherein the interactive supplier dashboard comprises a plurality of segments of a circular graphical interface, wherein the plurality of segments comprise (1) spend segment; (2) sourcing and procurement segment; (3) risk and control segment; (4) performance and health segment; (5) hosted applications segment; (6) channel compliance segment; (7) relationship management segment; and (8) third party oversight segment.

The computer implemented system, method and medium described herein provide unique advantages to global entities with many different supplier relationships, according to various embodiments of the invention. The innovative system and method implements an interactive comprehensive solution to supplier management and analytics. The system applies intelligence and data analytics to generate useful and timely statistics for various facts of the supplier relationship. The novel system enables a global entity to make informed decisions and action plans specific to suppliers. Other advantages include efficiency and improved relationships with suppliers in good standing. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 8 is an exemplary illustration of a Supplier Relationship Manager (SRM) View interface, according to an embodiment of the present invention.

DETAILED DESCRIPTION OF THE PREFERRED EMBODIMENT(S)

Figure 1:
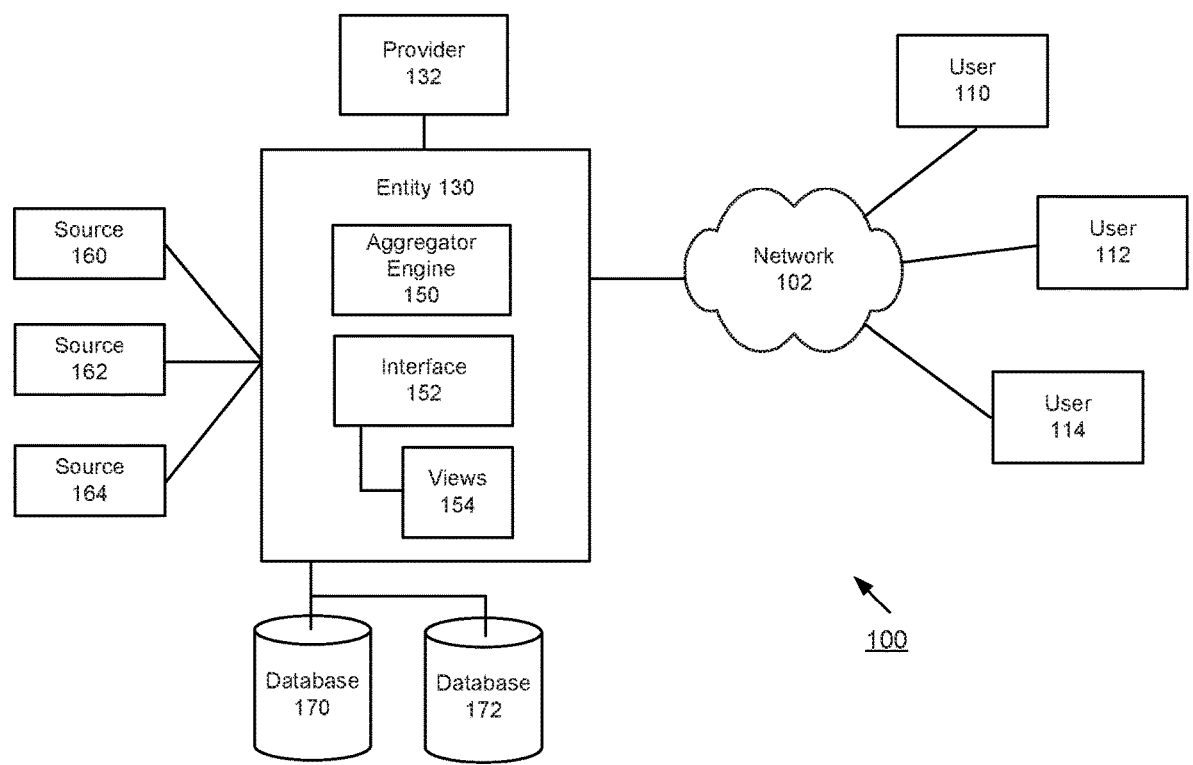
FIG. 1 illustrates a schematic diagram of a system that implements an interactive supplier dashboard, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an interactive supplier platform that brings together a mix of internal information and external sources to create a holistic picture. The interactive supplier platform assists a multitude of users, from control officer to senior executives, in assessing an overall supplier relationship between an institution and its supply base. The interactive supplier platform may use supplier identifiers to link various forms of disparate information under an easy navigable data visualization interface using a simplistic, yet data rich, "pie" display. Other types of interfaces, graphics and displays may be implemented.

A unique feature of this tool lies in its ability to help sourcing managers, senior executives and risk officers easily harness the power of the data they have to make informed decisions using a simplistic interface. The interactive supplier platform brings together at the Parent Supplier Level (including subsidiaries) various facets of a supplier (or portfolio of suppliers), which may include total spend, contract events and details, supplier performance and risk information, negative news, supplier diversity, application risk, and outstanding and past due action plans and risk acceptances.

The innovative tool may also be used by various outside third parties looking to market/sell sourcing departments across different industries a comprehensive tool that allows them to see supplier profiles within their inventory easily, quickly and in a easily digestible manner.

The innovative tool may implement data analytics as well as leverage predictive analytics models to use the data to make more informed decisions around sourcing new suppliers, terminating current suppliers, potential performance and risk issues, and event/market driven impacts to the portfolio.

The system may also provide recommendations based on supplier analytics and business goals. For example, the system may provide a recommendation to save costs by consolidating suppliers where analytics indicate that a particular supplier has a low performance score and charges twice as much as a similar supplier. Also, the system may provide specific recommendations that address risk exposure for the entity. For example, the system may recognize that a particular supplier's risk score has increased faster than other suppliers. The system may further provide insight into the factors and reasons for the high risk score, e.g., recent security breach with another entity, etc.

An embodiment of the present invention is directed to a centralized and comprehensive solution to understand an entity's entire supply base and suppliers. The solution covers a 360-degree understanding and view of how each supplier relates to a particular entity. Current systems may provide a total amount of spend for a particular supplier for a time frame. However, current systems fail to provide an understanding of outstanding contracts that are in process, a risk posture with the entity, the supplier's performance, financial viability, negative news, relationship from a banking perspective, revenue amount. The innovative tool indicates how a supplier falls into a third-party oversight program which is around various engagements, each risk rated individually and then as a whole. An understanding of this information is particularly useful for an entity trying to do business with the supplier to better understand the supplier's relationship at a detailed level.

An embodiment of the present invention is directed to visualization of the relevant information as well as a scoring methodology that assesses whether these vendors are risky or there are issues with them. For example, an embodiment of the present invention may provide a TPO Health Score that represents a weighted model. The weighted model considers performance scoring, effectiveness of supplier controls, financial viability assessment and negative news components. The visualization of the information enables various users to make quick informed decisions and further provide the ability to drilldown and view/analyze details behind each metric and measurement. Accordingly, users may plan out strategically how each line of business of an entity should work or interact with certain vendors.

An embodiment of the present invention is directing to parenting the data in a unique way. For example, a user may be focused on a particular supplier but fail to recognize the risks associated with a subsidiary of the particular supplier. An embodiment of the present invention parents this data into a Parent Supplier Level, which provides a more holistic view of the supplier's relationship. Otherwise, an entity may unknowingly engage relationships with various suppliers without understanding the corporate and other connections. The system may also consider affiliates, contractors, and/or other supplier relationships.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 illustrates a schematic diagram of a system that implements an interactive supplier dashboard, according to an exemplary embodiment. As illustrated, network 102 may be communicatively coupled with one or more data devices including, for example, computing devices associated with Users 110, 112, 114. Such devices may include computers, desktops, laptops, tables, mobile devices, mobile phones, smart devices, etc. Users may represent internal users as well as external users, including third parties, suppliers, merchants, and/or other providers. In addition, Network 102 communicates with Entity 130 that may represent a financial institution or other entity with multiple supplier relationships. Entity 130 may include a system that includes an Aggregator Engine 150, User Interface 152 with Views 154 and various processing components, including servers, processors, etc. Aggregator Engine 150 retrieves, processes, analyzes and aggregates supplier data relating to a plurality of suppliers, represented by Source 160, 162 and 164. Aggregator Engine 150 may also pre-stage and filter the supplier data. Supplier profile data and historical data may be stored and managed by Database 170. Also, Database 172 may also store reports, statistics and/or other analytics. The supplier dashboard features described herein may be provided by Entity 130 and/or a third party provider, represented by 132, where Provider 132 may operate with Entity 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users 110, 112, 114 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity 130.

Entity 130 may be communicatively coupled to Databases 170, 172. For example, Database 170, 172 may store supplier data, etc. Database 170, 172 may include any suitable data structure to maintain the information and allow access and retrieval of the information. For example, Database 170, 172 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 170, 172 may be any suitable storage device or devices. The storage may be local, remote, or a combination thereof with respect to Database 170, 172. Database 170, 172 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 170, 172 may have back-up capability built-in. Communications with Database 170, 172 may be over a network, such as network 102, or communications may involve a direct connection between Database 170, 172 and Entity 130, as depicted in FIG. 1. Database 170, 172 may also represent cloud or other network based storage.

Having described an example of the hardware, software, and data that can be used to run the system, an example of the method and user experience will now be described. The method will be described primarily as an example in system environment. However, those skilled in the art will appreciate that the principles of the invention can be applied to related circumstances.

Figure 2:
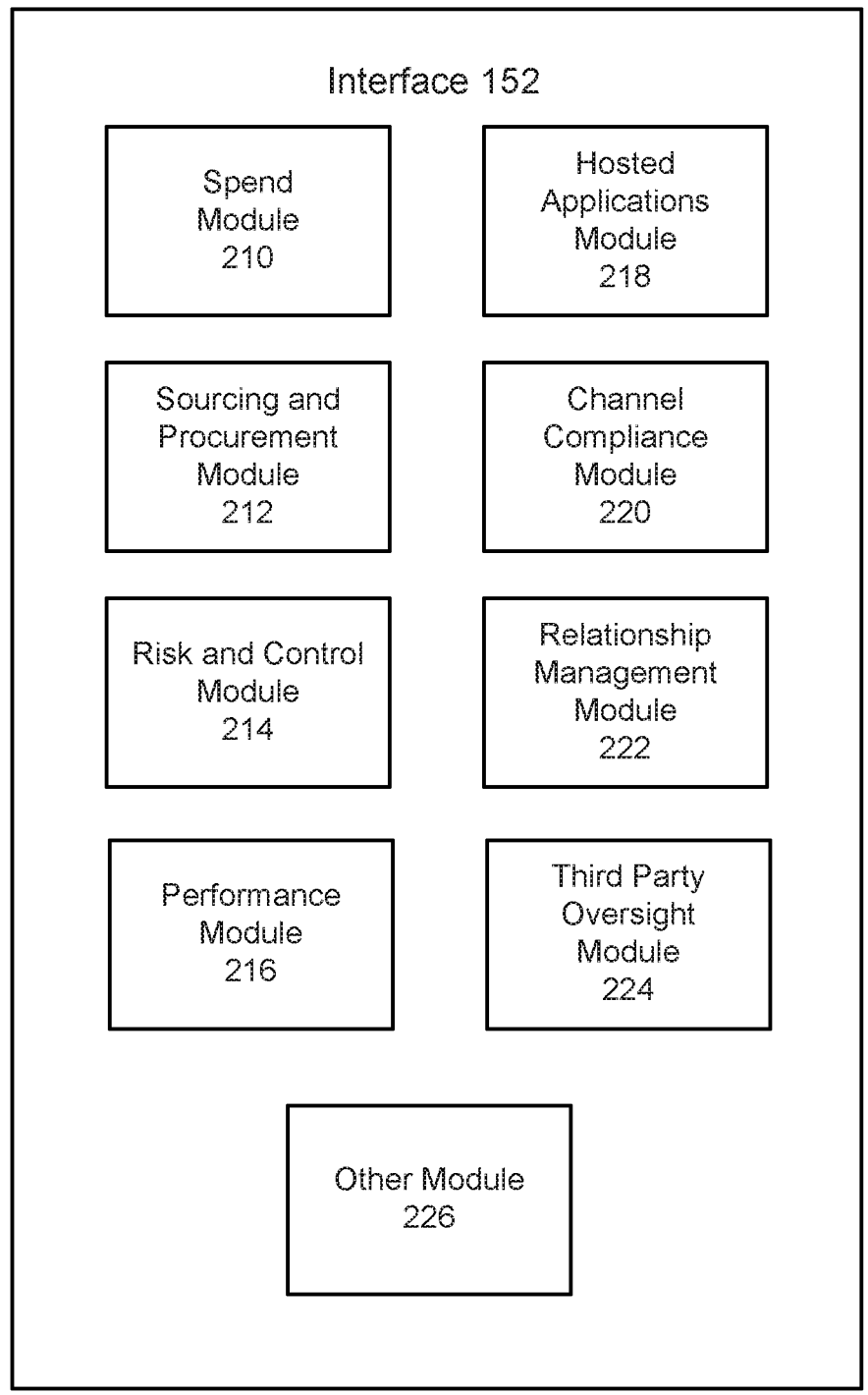
FIG. 2 is an exemplary Supplier Processor, according to an embodiment of the present invention.

FIG. 2 is an exemplary Interface, according to an embodiment of the present invention. Interface 152 may include various features, modules and views, including Spend Module 210, Souring and Procurement Module 212, Risk and Control Module 214, Performance Module 216, Hosted Applications Module 218, Channel Compliance Module 220, Relationship Management Module 224 and Third Party Oversight Module 226. Other features and functions may be provided by Other Module 226. These modules are exemplary and illustrative, Interface 152 may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Spend Module 210 may provide total spend for various time periods, e.g., year to date, fiscal years, quarterly, monthly, customized time period, etc. Spend data may be divided by categories, including lines of business, projects, assignments, geography, payment channel, etc. Reporting and/or exporting functions may be provided.

Souring and Procurement Module 212 may provide project pipeline and executed contracts data. Graphics may be provided that illustrate progress.

Risk and Control Module 214 may provide data relating to action plans, risk accepts, risk assignments past due. Additional details concerning past due, expired and other status information may also be provided.

Performance Module 216 may provide details concerning how a supplier is performing based on certain metrics and calculations. Depending on the type of supplier, industry and/or other factors, the performance calculation may be customized for a particular supplier or type of supplier.

Hosted Applications Module 218 may provide details concerning pending applications and corresponding status.

Channel Compliance Module 220 may include details concerning billing channels and other forms of communications.

Relationship Management Module 224 may provide details concerning a supplier's relationship with an entity. Relationship data may relate to subcontractors, customers, clients, etc.

Third Party Oversight Module 226 may provide details concerning third party engagements, and associated risks with such engagements.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 3:
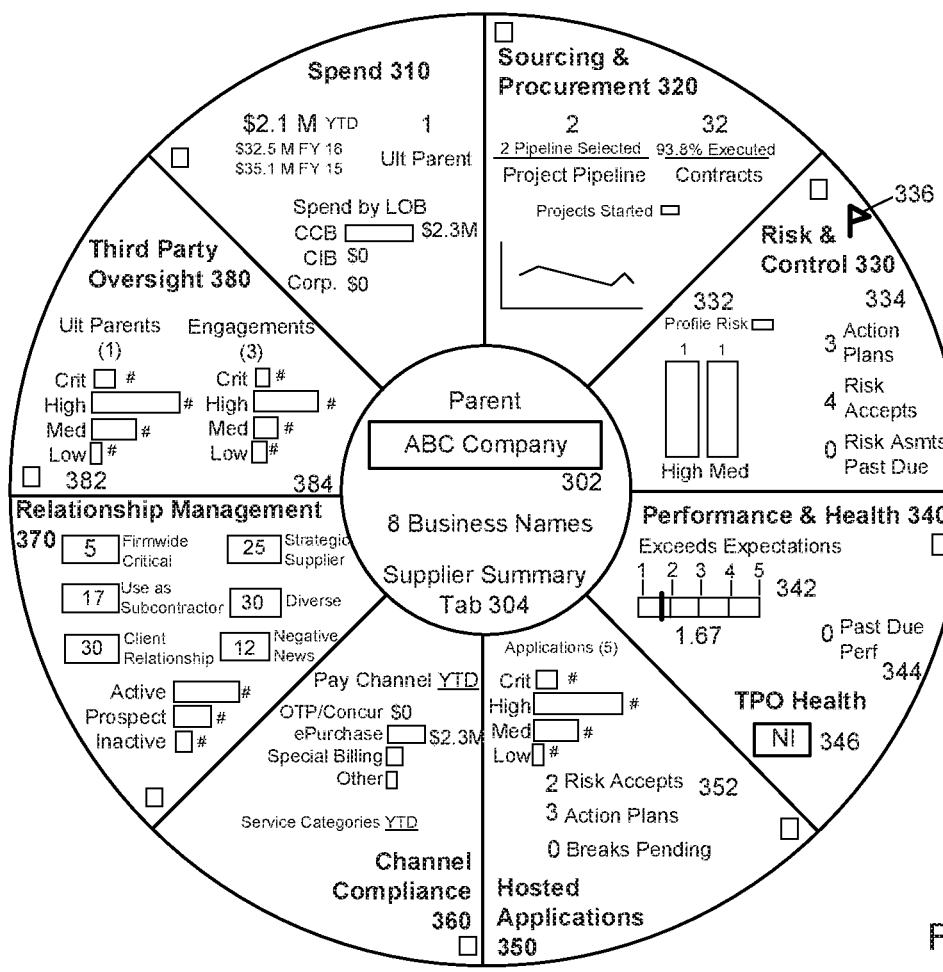
FIG. 3 is an exemplary Supplier Dashboard, according to an embodiment of the present invention.

FIG. 3 is an exemplary Supplier Dashboard, according to an embodiment of the present invention. The Supplier Dashboard provides a holistic view of a Supplier's combined Spend, Sourcing, Risk, Performance, Relationship Management and Operational components. According to an embodiment of the present invention, the Supplier Dashboard may access various data sources, including Spend RADAR, TPO Tools, SPARC, Phoenix, ITRC, SEAL, Category Playbook, CB Client DB, Bridger. An embodiment of the present invention provides linkages to various data sources, were the data sources may be linked to Ultimate Parent Name using a Source Supplier identifier, or other unique identifier.

The Supplier Dashboard may be accessed by various types of users. For example, sourcing managers may realize improved contract negotiation through a comprehensive view of supplier(s). Senior Executives may access the Supplier Dashboard as a one stop shop for a holistic Supplier view. Third Party Management Officers may realize improved supplier management and increased visibility during supplier selection. For Third Party Risk Managers, an embodiment of the present invention provides visibility for better monitoring and control of supplier risk and performance. Supplier Relationship Managers may access the Supplier Dashboard for transparency in managing full front-to-back supplier relationship. Executive Relationship Managers may access the Supplier Dashboard for a holistic Supplier view to understand key issues with Firmwide Critical Suppliers and other Strategic Suppliers.

As shown in FIG. 3, various interactive features may be provided. A user may provide a supplier name at an input 302. A supplier may be associated with multiple supplier names. An embodiment of the present invention is directed to identifying associated suppliers and aggregating the relevant information in a single interface. For example, a supplier may have 8 different business names, e.g., ABC North America, ABC Asia, etc. A Supplier Summary Tab 304 may present supplier related statistics summarized in an exportable data sheet, with the flexibility to choose Parent/Supplier level summary and specific metrics. For example, the user may toggle between multiple views, such as between chart view and a filter view.

At each segment or slice, the user may interact to view corresponding and underlying details and further perform actions such as export to a target application or platform. In addition, a user may click to view various time periods, such as Year to Date, All or other predetermined or user-defined time period. As shown in FIG. 3, segments may include Spend 310, Sourcing & Procurement 320, Risk & Control 330, Performance & Health 340, Hosted Applications 350, Channel Compliance 360, Relationship Management 370, and Third Party Oversight 380.

In Spend 310, year to date spend as well as Spend by Lines of Business may be displayed. Spend time frames may be customized and changed by the user. Comparisons may be performed between various time frames to illustrate progress and change.

In Sourcing & Procurement 320, supplier financial viability may be illustrated via a "Projects Started" graphic. Pipeline projects and contacts executed may be displayed as a line graph. Other graphics may be applied.

In Risk & Control 330, profile risk may be displayed at 332. Action Plans, Risk Accepts and Risk Assignments past due may be displayed at 334. Icon 336 represents a risk opinion flag for suppliers and permits users to view risk opinion details. Risk opinion flags and views Risk Opinions published by third party risk management.

Figure 14:
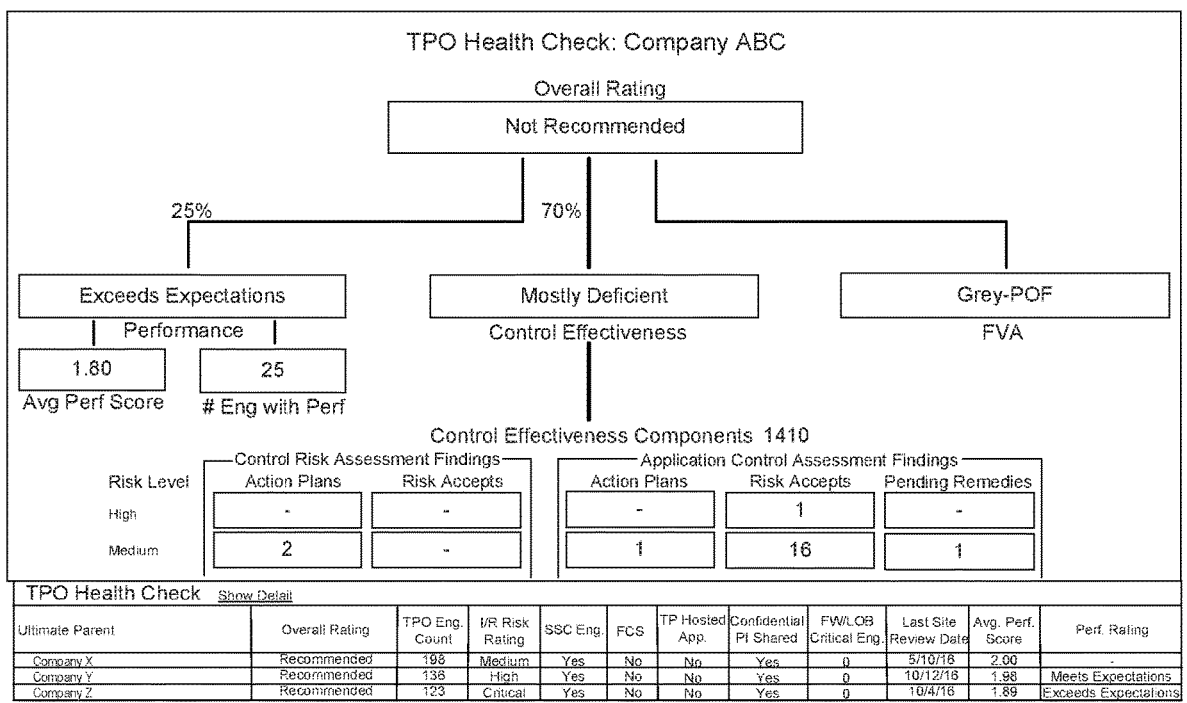
FIG. 14 is an exemplary illustration of a TPO Health Check View interface, according to an embodiment of the present invention.

In Performance & Health 340, a highlighted number of engagements with past due performance reviews may be displayed at 342 and 334, respectively. TP Health indicator may be shown at 346. TPO Health check consolidates key TPO Supplier Risk Due Diligence outcomes and provides guidance on eligibility of the supplier to participate in the Strategic Supplier Program (SSP). TPO Health Check for suppliers provides a shortcut to TPO health check view with additional details, as illustrated in FIG. 14.

In Hosted Applications 350, an integrated testing metric may be provided for supplier hosted applications. Risk Accepts, Action Plans and Breaks Pending remedies may be displayed at 352.

In Channel Compliance 360, Pay Channel and Service categories details may be displayed.

In Relationship Management 370, a user may limit the view by filtering segments for Firmwide Critical Suppliers. Also, supplier diversity data may be accessed. For example, relationships displayed may include firmwide critical, contractors, client relationships, strategic supplier, diversity data and negative news. For example, negative news may retrieve excerpts and/or stories from news articles, financial sources, social media feeds as well as other sources. Contractor information provides insights into whether a supplier is used as a subcontractor for other suppliers within an entity's network. This information is helpful to an entity to understand an entity's risk posture and how a particular supplier would affect other companies that an entity does business with. Request for Information (RFI) and Request for Proposal (RFP) data may also be provided. Other information that impacts a supplier's relationship may be provided. Active, prospective and inactive relationship may be provided as well as corresponding revenue data for relevant time periods, e.g., year to date (YTD), prior fiscal year (FY).

In Third Party Oversight 380, Ultimate Parents and Engagements details may be displayed at 382, 384.

A user may perform other functions. For example, a lock function may lock some or all current selections. The Lock button may lock existing filters but will allow a user to select additional filters to the locked filters. Selecting the Clear button will erase the additional filters and leave user with the filters initially locked. A Selections button provides a pop-up detailing the selections a user currently has within the Supplier Dashboard.

An embodiment of the present invention may be directed to applying predictive analysis to address risk, breaches and other compromises that may occur at a supplier. For example, the system may perform analytics to determine whether there is a correlation between data points with a supplier that has not yet experienced a data breach and determine whether one or more suppliers are susceptible to the same or similar type of breach. The system may then apply additional due diligence or generate an exit plan out of those supplier relationships. Other proactive actions may be taken based on a determined risk.

The illustration shown in FIG. 3 is one exemplary interface. Other variations may be implemented in accordance with the various embodiments of the present invention.

Figure 4:
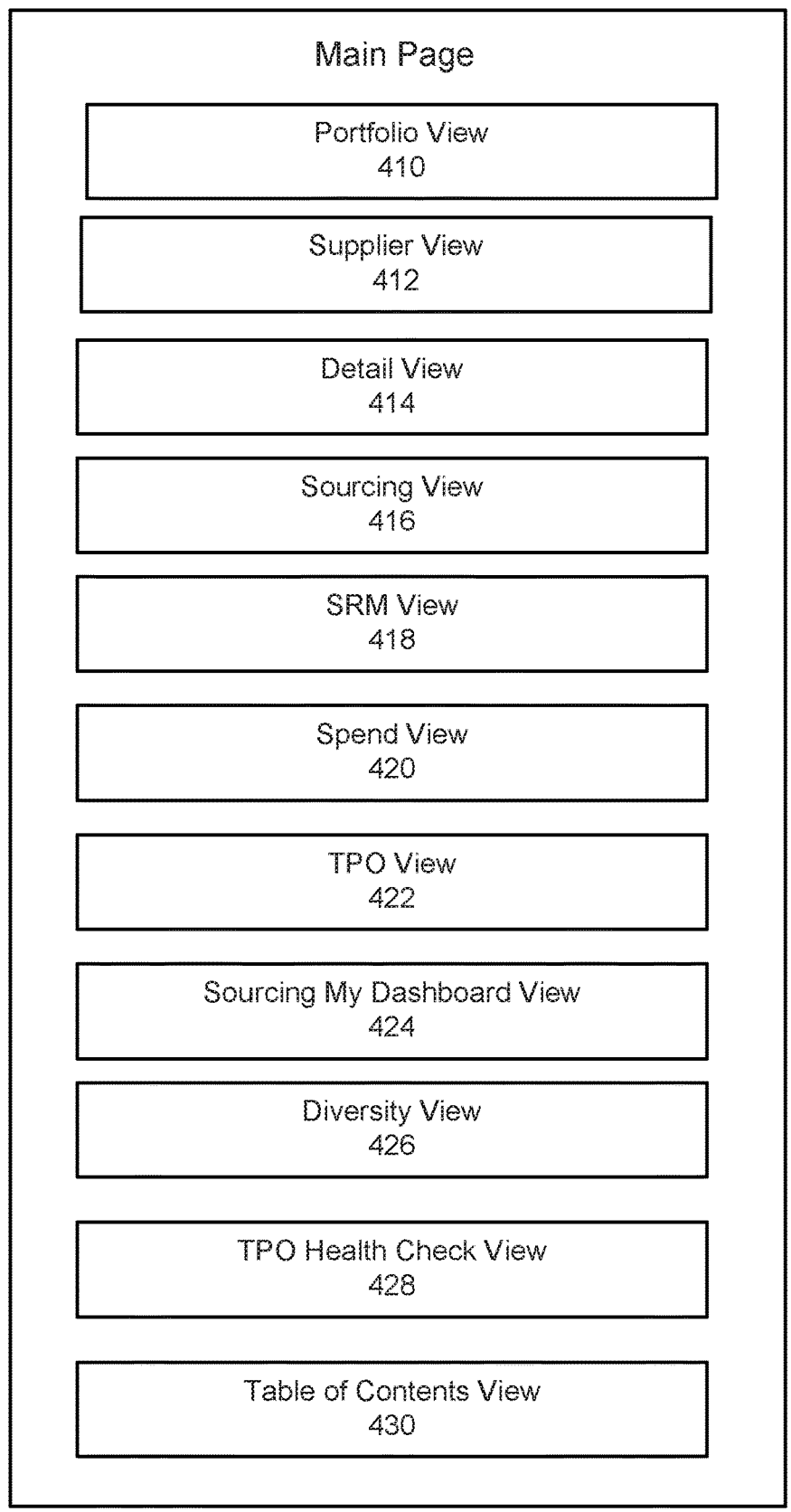
FIG. 4 is an exemplary Main Page of a Supplier Dashboard, according to an embodiment of the present invention.
Figure 15:
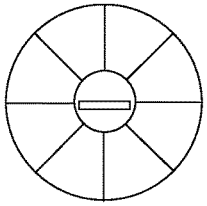
FIG. 15 is an exemplary illustration of a Table of Contents View interface, according to an embodiment of the present invention.

FIG. 4 is an exemplary Main Page of a Supplier Dashboard, according to an embodiment of the present invention. Supplier Dashboard may provide various Views, including Portfolio View 410 (FIG. 12), Supplier View 412 (FIG. 6), Detail View 414, Sourcing View 416, SRM View 418 (FIG. 7), Spend View 420 (FIG. 9), TPO View 422 (FIG. 10), Sourcing My Dashboard View 424 (FIG. 11), Diversity View 426 (FIG. 13), TPO Health Check View 428 (FIG. 14), and a Table of Contents View 430 (FIG. 15).

Figure 5:
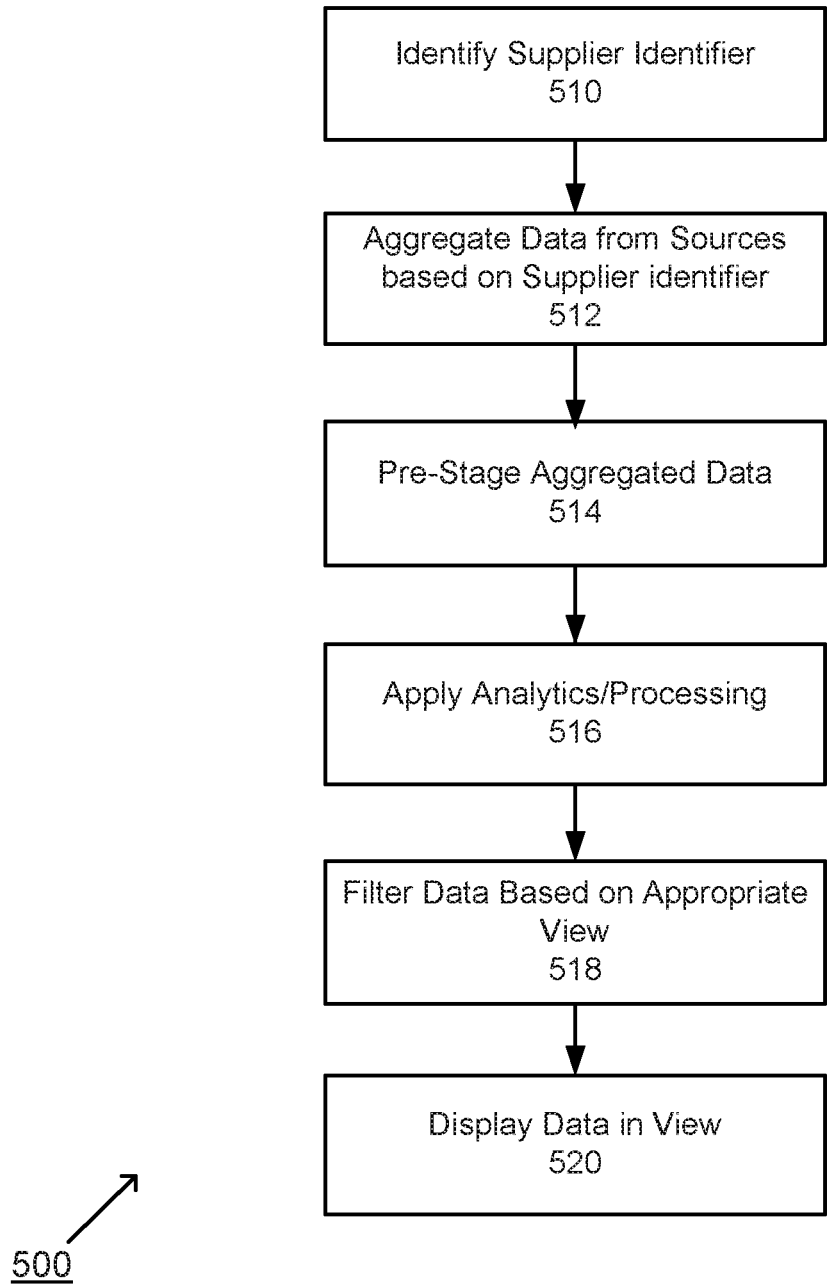
FIG. 5 is an exemplary flowchart for implementing a supplier dashboard, according to an embodiment of the present invention.

FIG. 5 is an exemplary flowchart for implementing an interactive Supplier Dashboard, according to an embodiment of the present invention. At step 510, a supplier may be identified by supplier name and/or identifier. At step 512, data may be aggregated from the sources based on the supplier identifier. At step 514, the system may pre-stage the aggregated data. At step 516, the system may apply analytics and processing. At step 518, filter data based on an appropriate view. At step 520, display data in the corresponding view. The order illustrated in FIG. 5 is merely exemplary. While the process of FIG. 5 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 510, a supplier may be identified by supplier name and/or identifier. A supplier may have different business names as well as affiliates, subsidiaries and other related entities. An embodiment of the present invention is directed to providing a comprehensive holistic understanding of a supplier's relationship with an entity.

At step 512, data may be aggregated from the sources based on the supplier identifier. Data associated subsidiaries and other affiliates may be retrieved from various sources.

At step 514, the system may pre-stage the aggregated data. The aggregated data may be processed and prepared for display and interaction.

At step 516, the system may apply analytics and processing. The analytics and processing may be specific to a particular segment, including: spend segment; sourcing and procurement segment; risk and control segment; performance and health segment; hosted applications segment; channel compliance segment; relationship management segment; and third party oversight segment.

At step 518, filter data based on an appropriate view. The data may be retrieved and formatted for each of the segments.

At step 520, display data in the corresponding view. The data may be provided in an interactive supplier dashboard that the user may interact with.

Figure 6:
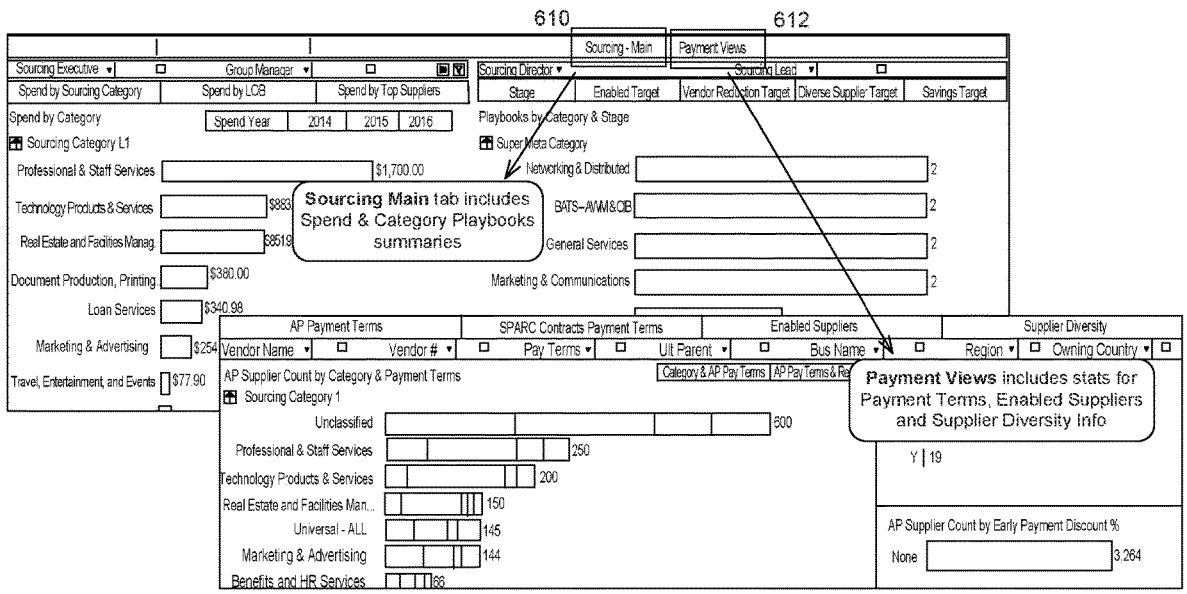
FIG. 6 is an exemplary illustration of a Sourcing View interface, according to an embodiment of the present invention.

FIG. 6 is an exemplary illustration of a Sourcing View interface, according to an embodiment of the present invention. FIG. 6 represents a detailed Sourcing View that provides analytics and additional supplier insight specific to their functional areas. Sourcing view presents data visualization and analytics around Category Playbooks, Payment Terms, Enabled Suppliers and Supplier Diversity, etc. A Sourcing Main tab 610 includes spend and category playbooks summaries. A Payment Views tab 612 includes statistics for payment terms, suppliers and supplier diversity information.

Figure 7:
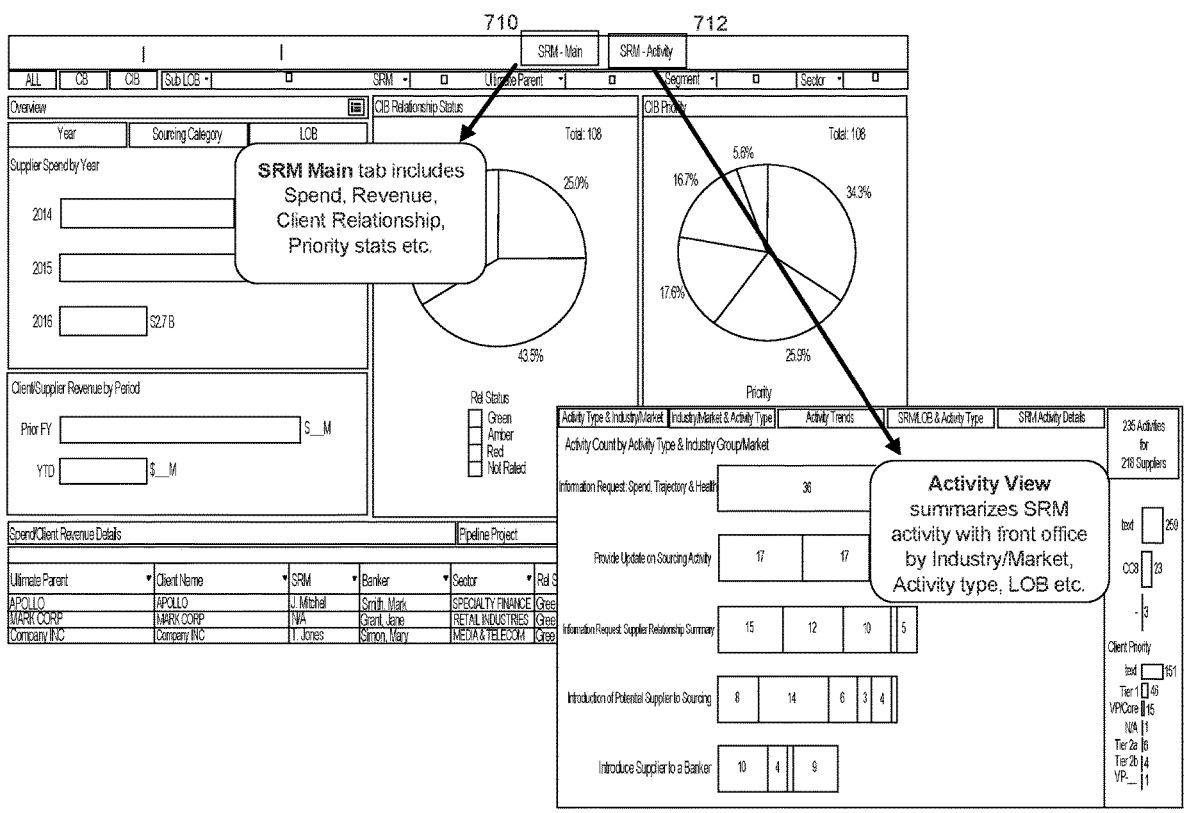
FIG. 7 is an exemplary illustration of a Supplier Relationship Manager (SRM) View interface, according to an embodiment of the present invention.

FIG. 7 is an exemplary illustration of a Supplier Relationship Manager (SRM) View interface, according to an embodiment of the present invention. FIG. 7 represents a detailed SRM View that provides analytics and additional supplier insight specific to their functional areas. SRM view integrates client and supplier data including spend, revenue, client priority, relationship status, etc. to enable full front to back relationship management. A SRM Main tab 710 includes spend, revenue, client relationship, priority statistics, etc. Activity View 712 summarizes SRM activity with front office by Industry/Market, Activity type, Line of Business, etc.

FIG. 8 is an exemplary illustration of a Supplier Relationship Manager (SRM) View interface, according to an embodiment of the present invention. FIG. 8 enables users to create reports, such as Client/Supplier Match 810, NDA report 812, Pipeline Deals 814, Tech Sourcing Pipeline 816, Sourcing Deal Summary 818 and Client Summary by Team 820.

Figure 9:
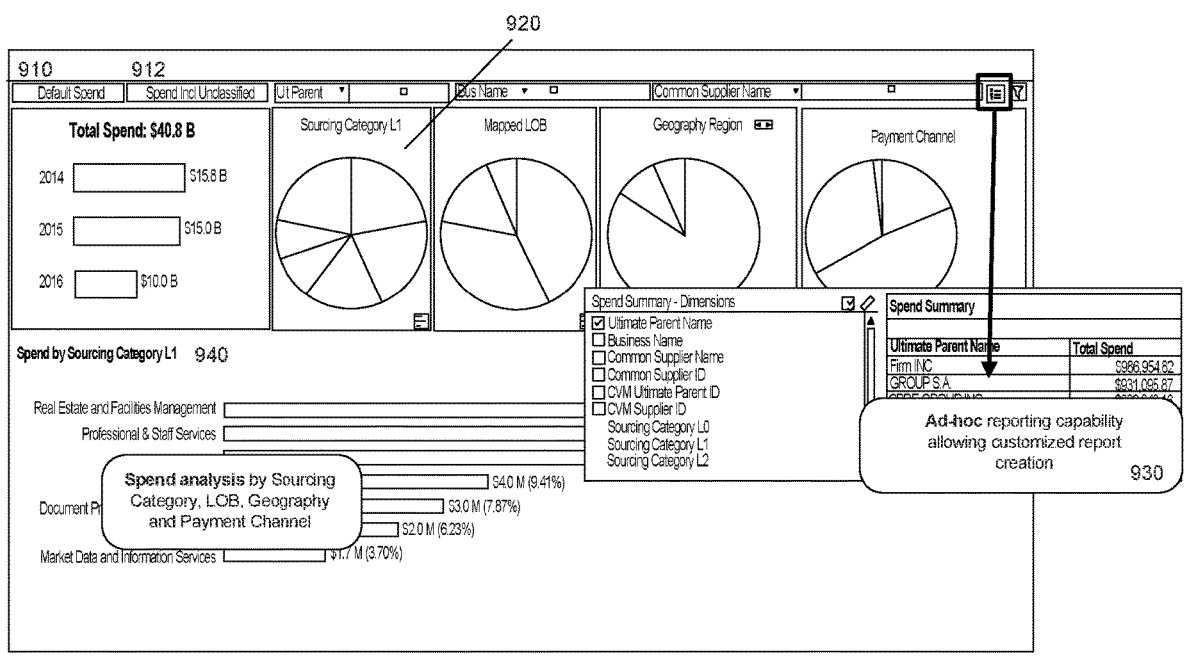
FIG. 9 is an exemplary illustration of a Spend View interface, according to an embodiment of the present invention.

FIG. 9 is an exemplary illustration of a Spend View interface, according to an embodiment of the present invention. Spend View provides flexible spend analysis with data visualization and ad-hoc reporting capability. FIG. 9 provides interactive graphics that illustrates a Default Spend 910 and Spend including unclassified 912. Graphics may be displayed for Sourcing Category, Mapped LOB, Geography Region and Payment Channel, at 920. A reporting capability may include ad hoc reporting capability allowing customized report creation, as shown by 930. Spend analysis may be illustrated at 940.

Figure 10:
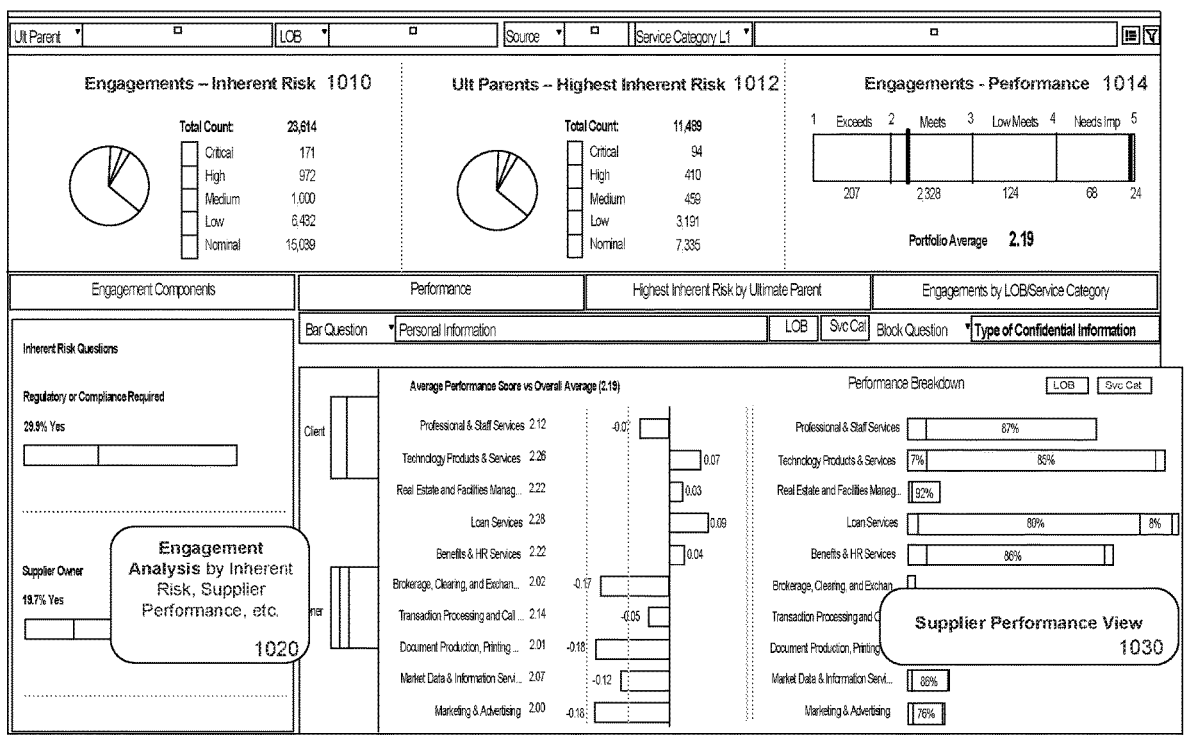
FIG. 10 is an exemplary illustration of a Third Party Oversight (TPO) View interface, according to an embodiment of the present invention.

FIG. 10 is an exemplary illustration of a Third Party Oversight (TPO) View interface, according to an embodiment of the present invention. TPO provides data integration and analytics from different areas including inherent risk (IR) and performance. TPO View illustrates Engagement inherent risks at 1010, highest inherent risk at 1012 as well as a performance graphic at 1014. Engagement analysis by inherent risk, supplier performance, and/or other factors may be provided at 1020. Supper Performance View at 1030 illustrates performance breakdowns by services and/or other categories. For example, risk calculations may utilize ratings of supplier engagements from an inherent risk which translates into a Critical, High, Medium, Low and Nominal risk profile. Inherent risk calculations may consider operations, technology and compliance categories. Operations may relate to whether an engagement is considered firm-wide critical, critical to LOB or sub-LOB; an expected recovery time during outages and level of difficulty in replacing requested services. Technology may relate to data classification; volume of records received, sent, transmitted, stored, processed or accessed; whether the engagement involves a supplier owned or licensed application that processes sensitive data; and whether the supplier will have remote access to an internal network. Compliance may relate to whether a product or service involves customer contact or customer access and whether there are regulatory or compliance requirements. Other considerations and factors may be implemented. The system may calculate individual scores and apply weights to generate an overall inherent risk calculation.

Figure 11:
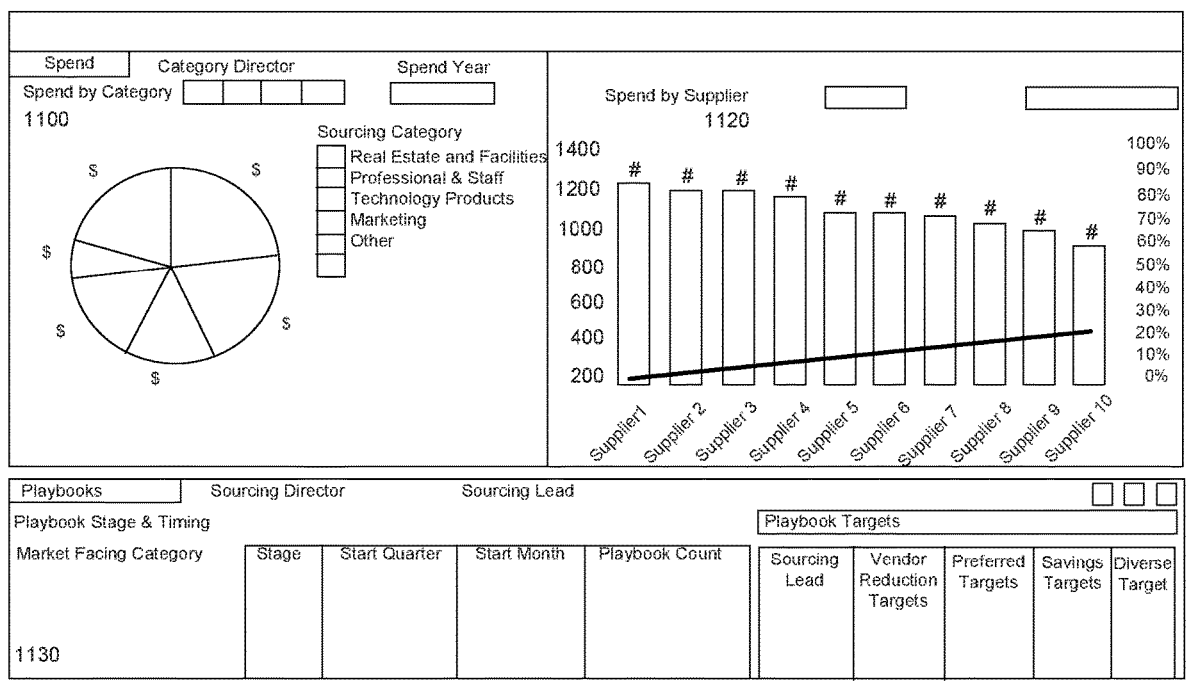
FIG. 11 is an exemplary illustration of a Sourcing My Dashboard View interface, according to an embodiment of the present invention.

FIG. 11 is an exemplary illustration of a Sourcing My Dashboard View interface, according to an embodiment of the present invention. Sourcing My Dashboard View provides a Category Director/Sourcing Lead a focused dashboard to provide ease of use into spend and category playbook information. With FIG. 11, a Category Director/Sourcing Lead may access a focused dashboard to provide ease of use into spend and category playbook information. FIG. 11 provides a direct link to SRM Front Office Activity SharePoint tracker to allow a daily automatic data refresh with most up-to-date SRM activity. As shown in FIG. 11, spend by category analysis may be displayed at 1110. A spend by supplier graphic is shown at 1120. Playbooks data may be shown at 1130.

Figure 12:
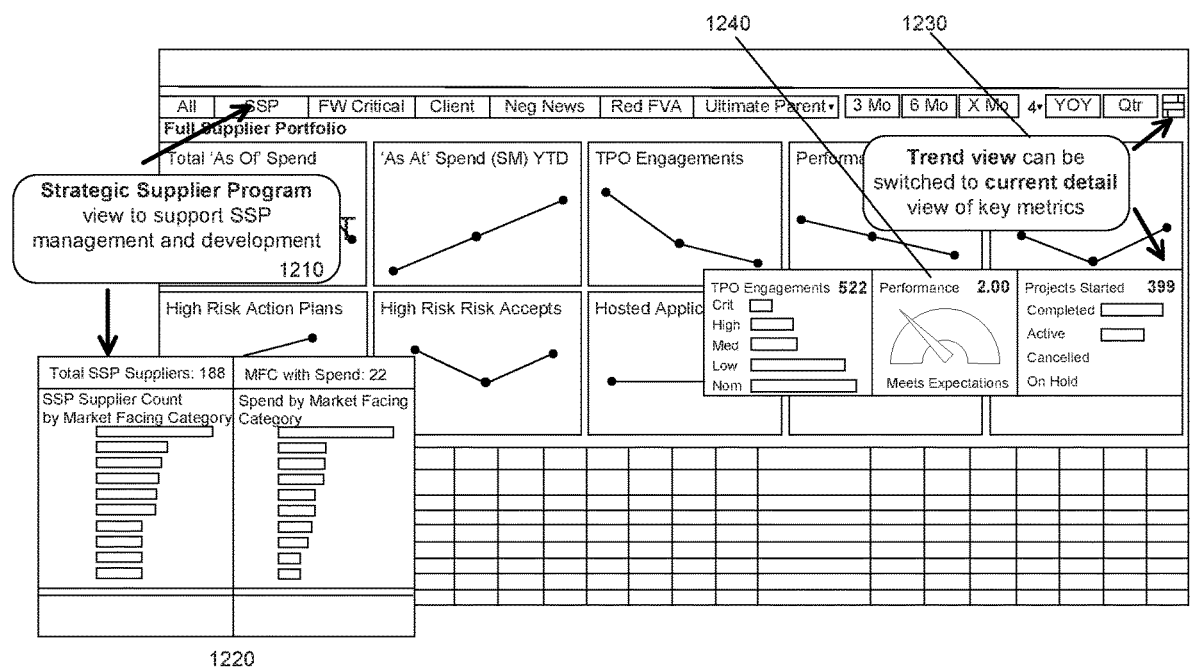
FIG. 12 is an exemplary illustration of a Portfolio View interface, according to an embodiment of the present invention.

FIG. 12 is an exemplary illustration of a Portfolio View interface, according to an embodiment of the present invention. Portfolio View presents historical data and trending on key metrics for supplier portfolios such as SSP, Firmwide Critical, Client suppliers, etc. Strategic Supplier Program (SSP) supports SSP management and development. As shown in FIG. 12, Strategic Supplier Program view may be selected at 1210 where details may be provided at 1220. Trend View 1230 may be switched to current detail view of key metrics. For example, TPO Engagements, Performance and Projects Started details may be provided at 1240. Performance may represent an average performance rating for the Parent supplier which aggregates the most recent available performance scores and utilizes an average function to equate to a supplier performance rating.

Figure 13:
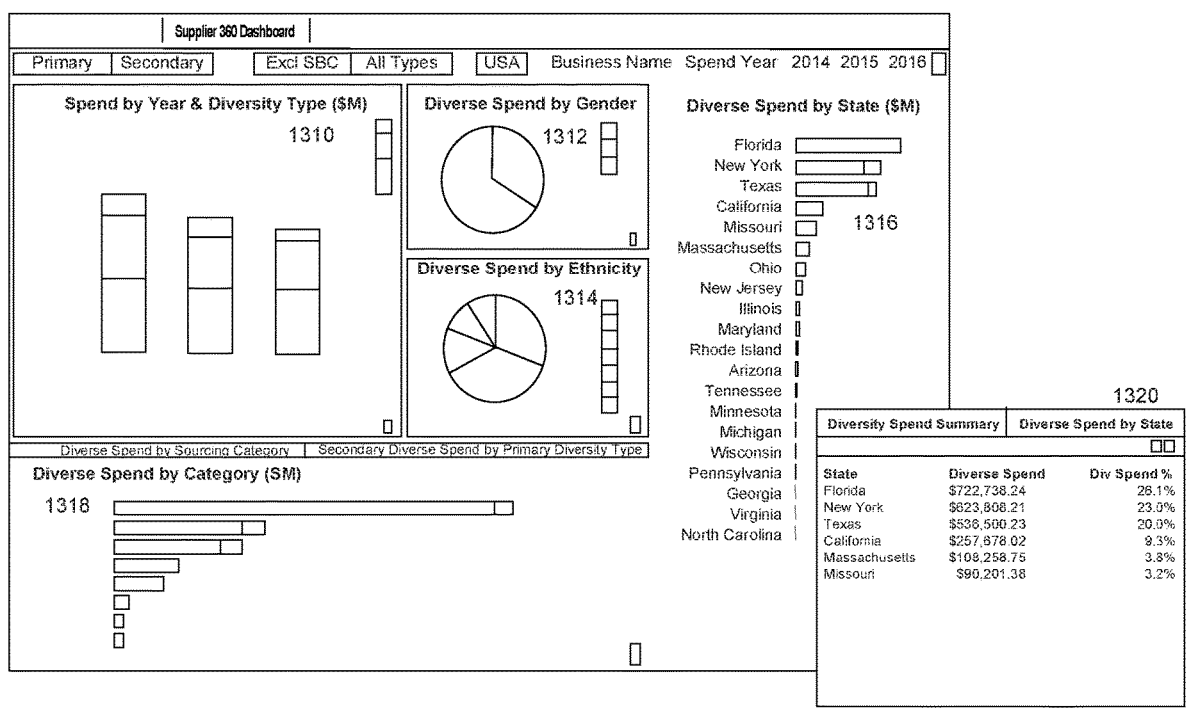
FIG. 13 is an exemplary illustration of a Diversity View interface, according to an embodiment of the present invention.

FIG. 13 is an exemplary illustration of a Diversity View interface, according to an embodiment of the present invention. Diversity View provides diverse supplier analysis to promote and support the Supplier Diversity program and goals. As shown in FIG. 13, Spend by year and diversity type may be displayed at 1310. Diversity spend by gender is shown at 1312; diversity spend by ethnicity is shown at 1314; and diversity by state is shown at 1316. Diverse spend by category is shown at 1318. Details for Diversity spend by state may be shown at 1320.

FIG. 14 is an exemplary illustration of a TPO Health Check View interface, according to an embodiment of the present invention. TPO Health Check consolidates key TPO Supplier Risk Due Diligence outcomes and provides guidance on eligibility of the supplier to participate in the Strategic Supplier Program (SSP). Components of TPO Health check are shown to provide clarity and explanation on how the score is derived, at 1410. Control Effectiveness components may include control risk assessment findings and application control assessment findings. TPO Health Check 1420 provides a list view of TPO Health score for TPO ultimate parent suppliers. For example, Grey-POF may represent a grey rating due to "Parent only Financials" (POF), which means that the subsidiary did not submit independent financials and that the system relies on the parent company financials for the financial viability assessment (FVA). Other examples may include no or incomplete financials (NOF), unaudited financials (UAF), etc.

For example, TPO Health Check may consider various criteria, such as performance (PE), financial viability assessment (FVA), control effectiveness (CE), negative news, security incidents and/or other factors. The criteria may then be used to generate a Scoring Model, that applies performance weight, FVA weight and/or CE weight.

FIG. 15 is an exemplary illustration of a Table of Contents View interface, according to an embodiment of the present invention. Table of Contents summarizes content in key dashboard areas and provides quick links for easy navigation to commonly viewed data. It also includes FAQs and a functionality reference section. As shown in FIG. 15, Key Dashboard Areas include a summary of content and quick links for navigation at 1510. FAQs section answers for frequently asked questions is shown at 1520. Functionality Reference may include a navigation and functionality guide, as illustrated at 1530.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an interactive supplier dashboard, the system comprising:
   a memory that stores and manages supplier profile data and historical data;
   an interactive user interface; and
   a supplier processor, coupled to the memory and the interactive user interface, programmed to:
   receive, via the interactive user interface, a supplier identifier associated with a supplier;
   identify one or more sources of supplier data using the supplier identifier;
   retrieve data from the one or more sources of supplier data identified using the supplier identifier;
   update historical data based on the data retrieved from the one or more sources of supplier data aggregate data from the one or more sources of supplier data;
   pre-stage the aggregated data for the interactive supplier dashboard, wherein pre-staging the aggregated data comprises processing the aggregated data to prepare that data for display and user interaction;
   apply one or more predictive analytics models to the pre-staged aggregated data, based on the historical data in the memory;
   create one or more recommendations, based on the results of the one or more predictive analytics models, wherein the recommendations address risk exposure, supplier performance, and cost savings;
   communicate, via the interactive supplier dashboard, the pre-staged aggregated data for the supplier and the one or more recommendations; wherein the interactive supplier dashboard comprises a plurality of segments of a circular graphical interface; and
   provide, via the interactive user interface, one or more links to one or more additional interactive interfaces configured to create reports and provide additional supplier information; and
   wherein the plurality of segments comprise (1) spend segment; (2) sourcing and procurement segment; (3) risk and control segment; (4) performance and health segment; (5) hosted applications segment; (6) channel compliance segment, wherein the channel compliance segment includes details concerning billing channels;

(7) relationship management segment, wherein the relationship management segment includes information about negative supplier news, diversity data, contractor status, request for information data, request for proposal data, and an indication of supplier status comprising one of active, inactive, and prospective; and (8) third party oversight segment.

2. The system of claim 1, wherein the supplier identifier identifies one or more associated suppliers.

3. The system of claim 1, wherein the spend segment provides a total spend associated with the supplier for a predetermined time period.

4. The system of claim 1, wherein sourcing and procurement segment provides project pipeline and executed contracts data specific to the supplier.

5. The system of claim 1, wherein the risk and control segment provides data relating to action plans, risk accepts, risk assignments past due specific to the supplier.

6. The system of claim 1, wherein the performance and health segment provides an overall health score for the supplier.

7. The system of claim 1, wherein the hosted applications segment provides details concerning pending applications and corresponding status specific to the supplier.

8. The system of claim 1, wherein the channel compliance segment provides details concerning billing channels specific to the supplier.

9. The system of claim 1, wherein the relationship management segment provides details concerning the supplier's relationship with an entity.

10. The system of claim 1, wherein the third party oversight segment provides details concerning third party engagements, and associated risks with such engagements.

11. A method of implementing an interactive supplier dashboard, the method comprising the steps of:
   receiving, via an interactive user interface, a supplier identifier associated with a supplier;
   identifying one or more sources of supplier data using the supplier identifier;
   retrieving data from the one or more sources of supplier data identified using the supplier identifier;
   analyzing the data from the one or more sources of supplier data, the analysis including predictive analytics based in part on a set of historical data;
   updating the set of historical data based on the data retrieved from the one or more sources of supplier data
   aggregating data from the one or more sources of supplier data;
   pre-staging the aggregated data for the interactive supplier dashboard, wherein pre-staging the aggregated data comprises processing the aggregated data to prepare that data for display and user interaction;
   applying one or more predictive analytics models to the pre-staged aggregated data, based on the historical data in the memory;
   creating one or more recommendations, based on the results of the one or more predictive analytics models, wherein the recommendations address risk exposure, supplier performance, and cost savings;
   communicating, via the interactive supplier dashboard, the pre-staged aggregated data for the supplier and the one or more recommendations; wherein the interactive supplier dashboard comprises a plurality of segments of a circular graphical interface; and
   providing, via the interactive user interface, one or more links to one or more additional interactive interfaces configured to create reports and provide additional supplier information; and
   wherein the plurality of segments comprise (1) spend segment; (2) sourcing and procurement segment; (3) risk and control segment; (4) performance and health segment; (5) hosted applications segment; (6) channel compliance segment, wherein the channel compliance segment includes details concerning billing channels; (7) relationship management segment, wherein the relationship management segment includes information about negative supplier news, diversity data, contractor status, request for information data, request for proposal data, and an indication of supplier status comprising one of active, inactive, and prospective; and (8) third party oversight segment.

12. The method of claim 11, wherein the supplier identifier identifies one or more associated suppliers.

13. The method of claim 11, wherein the spend segment provides a total spend associated with the supplier for a predetermined time period.

14. The method of claim 11, wherein sourcing and procurement segment provides project pipeline and executed contracts data specific to the supplier.

15. The method of claim 11, wherein the risk and control segment provides data relating to action plans, risk accepts, risk assignments past due specific to the supplier.

16. The method of claim 11, wherein the performance and health segment provides an overall health score for the supplier.

17. The method of claim 11, wherein the hosted applications segment provides details concerning pending applications and corresponding status specific to the supplier.

18. The method of claim 11, wherein the channel compliance segment provides details concerning billing channels specific to the supplier.

19. The method of claim 11, wherein the relationship management segment provides details concerning the supplier's relationship with an entity.

20. The method of claim 11, wherein the third party oversight segment provides details concerning third party engagements, and associated risks with such engagements.

* * * * *